July 22, 1930. F. A. ARBOGAST 1,770,904
FISH BAIT OR LURE
Filed Aug. 11, 1928
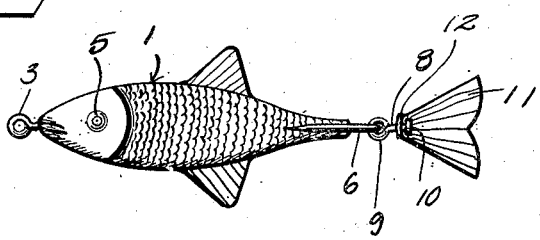
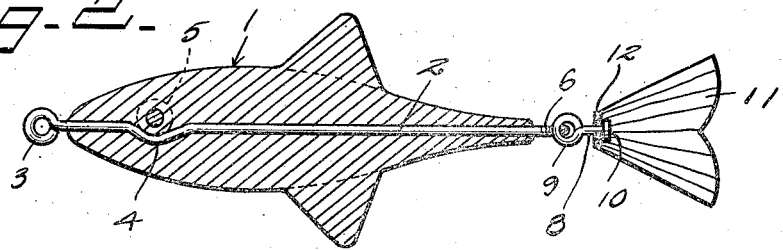
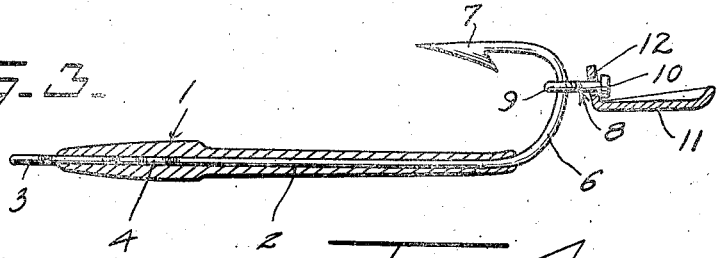
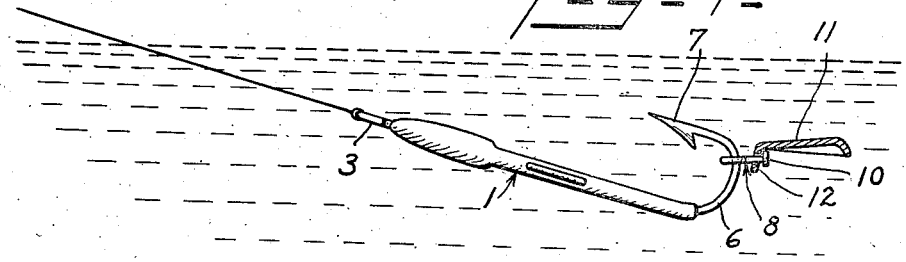
Inventor
F. A. Arbogast
By Watson E. Coleman
Attorney Patented July 22, 1930

1,770,904

UNITED STATES PATENT OFFICE

FREDERICK A. ARBOGAST, OF AKRON, OHIO

FISH BAIT OR LURE     REISSUED

Application filed August 11, 1928. Serial No. 298,965.

This invention relates to a fish lure and has for its primary object to provide a lure simulating a live bait such as a minnow or the like and designed to imitate, when in the water, the actions of an injured minnow.

It is well-known that a crippled minnow provides a very effective bait or lure for game fish as it moves erratically through the water, wobbling from side to side, and is, therefore, easy prey for larger fish. The present invention, in the form of a minnow, is designed to imitate these peculiar actions for the purpose of luring fish to strike the hook which forms a part of the lure.

The invention broadly contemplates the provision of a cast metal minnow through the center of the body of which there extends the shank of a hook, the curved portion of the hook extending from the tail while the free end of the shank projects from the mouth of the minnow and is formed in an eye for convenient attachment to a line. The hook is arranged in a horizontal plane at one side of the body of the bait and attached thereto is a spinner which is freely movable about the curved portion thereof and is prevented from coming off by the hook barb. The minnow when in the water assumes a position on its side with the hook in upright position, the spinner acting to give erratic movement to the lure, making the same appear to be an injured minnow.

A further object of the invention is to provide a cast lure wherein the hook extends throughout the body thereof and is securely embedded therein.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in side elevation of the fish lure embodying the present invention;

Figure 2 is a central vertical longitudinal sectional view through the same;

Figure 3 is a central horizontal longitudinal sectional view;

Figure 4 is a view in side elevation of the lure in operation.

Referring to the drawing in detail, the numeral 1 indicates the body of the lure which as shown is preferably cast in the form of a minnow.

Extending longitudinally through this body is the elongated shank 2 of a special hook structure, the free end of the shank projecting from the mouth of the minnow as shown and terminating in the eye 3 to which is attached the fishing line or guide, not shown.

Inwardly of the eye 3 the shank 2 is formed to provide the offset 4 which, after the shank has been cast in the minnow body, provides space for the proper insertion of the artificial eyes 5.

The free end of the shank 2 where it joins the hook bend 6 extends from the rear central portion of the fish body and then is directed forwardly thereof and at one side of the same, the point and barb 7 being arranged laterally of the artificial fish body as shown.

Freely slidably mounted upon the curved portion 6 of the hook is a pin 8, the eye portion 9 thereof having the hook extended therethrough. The free end of the pin is provided with the head 10 which retains thereon the spinner 11, the pin 8 extending through the angled portion 12 thereof, which portion is freely rotatable thereon.

When the present lure is in use, the artificial minnow 1 will assume a position on its side in the water, the pull of the spinner at one side of the longitudinal center and in substantial alinement with the eye 3 to which the fishing line or leader is attached, maintaining the hook in upright position over the minnow body. The spinner 11 also acts to give a wobbling or side to side movement to the bait, thus causing the same to appear and act like an injured minnow.

In forming the present lure, a suitable mould is provided to give the proper form to the minnow and previous to the casting operation a hook is positioned in the mould with the hook point or bend arranged in a plane at right angles to the body of the mould.

Proper metal such as tin or the like is then introduced in the proper molten state, the same solidifying about the hook shank, thus firmly embedding the hook in the molded minnow body. The bend of the hook is arranged in a parallel plane to the sides of the minnow body at the point in the body where the artificial eyes are to be placed, the mould being provided with suitable means for forming the proper indentations to receive the eyes. The eyes may then be secured in these indentations, positioning in the offset portion 4 of the shank. The body may then be given the proper colors and the spinner 11 fixed to the curved portion of the hook in the manner shown.

While I have specifically shown and described a minnow form of lure, it is, of course, to be understood that I do not wish to be limited in this respect for it will be readily obvious that any other form of lure body may be employed, the principal feature of the invention residing in the rigid connection of the hook shank with the lure body and of the attachment of the spinner directly to the bend of the hook in such a manner that it will have unrestricted movement throughout the bent portion.

Having thus described my invention, what I claim is:—

1. A fish lure comprising a cast body simulating a minnow, a hook comprising an elongated shank extending longitudinally through the body and having the free end projecting from the head thereof and formed to provide an eye, the curved portion of the hook projecting from the tail of the minnow body and arranged in a plane substantially at right angles to the side of the body, and a spinner carried by the curved portion of the hook and designed to cause the body to assume a position on its side and impart erratic movements thereto when in use.

2. A fish lure comprising a cast body simulating a minnow, a hook comprising an elongated shank extending longitudinally through the body and having the free end projecting from the head thereof and formed to provide an eye, the curved portion of the hook projecting from the tail of the minnow body and arranged in a plane substantially at right angles to the side of the body, and a spinner carried by the curved portion of the hook and designed to cause the body to assume a position on its side and impart erratic movements thereto when in use, said spinner being slidably mounted upon the hook between the adjacent tail portion of the minnow body and the hook barb.

3. A fish lure, comprising a relatively flat cast body simulating a minnow, a hook carried by the body having a shank embedded in and extending through the longitudinal center thereof, means for attaching a line to the head of the minnow, eyes embedded in the head of the body, and an offset formed in said hook shank and extending vertically in the body between said eyes to permit proper positioning of the same in the body.

4. A bait of the character described, comprising a lure body, a hook having a shank attached to and rigid with the body, a spinner, and a swivel directly connecting the spinner with the bend of the hook and having unrestricted movement thereon, said spinner, by reason of its free movement on the hook bend, acting to so control the lure body as to maintain the hook substantially upright.

5. A bait of the character described, comprising a lure body, a hook having a shank attached to and rigid with the body, a pin member having a closed eye at one end and having the bend of the hook extended therethrough, the said pin being freely movable throughout the hook bend, and a spinner having loose connection with said pin whereby it may rotate thereon, said spinner being adapted by reason of its free movement on the hook bend to so control the lure body as to maintain the hook substantially upright.

In testimony whereof I hereunto affix my signature.

FREDERICK A. ARBOGAST.